(12) United States Patent
Fabijancic

(10) Patent No.: US 10,909,113 B2
(45) Date of Patent: Feb. 2, 2021

(54) GLOBAL DICTIONARY FOR DATABASE MANAGEMENT SYSTEMS

(71) Applicant: Toni Fabijancic, Eppelheim (DE)

(72) Inventor: Toni Fabijancic, Eppelheim (DE)

(73) Assignee: SAP SE, Walldorf (DE)

( * ) Notice: Subject to any disclaimer, the term of this patent is extended or adjusted under 35 U.S.C. 154(b) by 1956 days.

(21) Appl. No.: 13/955,994

(22) Filed: Jul. 31, 2013

(65) Prior Publication Data

US 2015/0039585 A1    Feb. 5, 2015

(51) Int. Cl.
*G06F 16/30* (2019.01)
*G06F 16/2453* (2019.01)
*G06F 16/2458* (2019.01)

(52) U.S. Cl.
CPC ...... *G06F 16/2453* (2019.01); *G06F 16/2471* (2019.01)

(58) Field of Classification Search
None
See application file for complete search history.

(56) References Cited

U.S. PATENT DOCUMENTS

| | | | |
|---|---|---|---|
| 5,414,834 A | 5/1995 | Alexander et al. | |
| 5,794,229 A | 8/1998 | French et al. | |
| 6,457,021 B1 | 9/2002 | Berkowitz et al. | |
| 7,120,776 B2 | 10/2006 | Rajamani et al. | |
| 7,937,415 B2 | 5/2011 | Ducaule et al. | |
| 7,974,967 B2 | 7/2011 | Scheuermann | |
| 8,082,412 B2 | 12/2011 | Bodmer et al. | |
| 8,132,162 B2 | 3/2012 | Peterson | |
| 8,285,707 B2 | 10/2012 | Day et al. | |
| 8,464,023 B2 | 6/2013 | Devendran et al. | |
| 2006/0218123 A1* | 9/2006 | Chowdhuri et al. | 707/2 |
| 2006/0253749 A1 | 11/2006 | Alderegula et al. | |
| 2006/0281556 A1 | 12/2006 | Solomon et al. | |
| 2010/0250577 A1* | 9/2010 | Cao | G06F 17/30448 707/760 |
| 2011/0227754 A1* | 9/2011 | Hill | G06F 17/30412 340/870.01 |
| 2012/0117064 A1* | 5/2012 | Draese | G06F 16/283 707/737 |
| 2012/0323971 A1 | 12/2012 | Pasupuleti | |
| 2013/0013602 A1 | 1/2013 | Manner et al. | |
| 2013/0046940 A1 | 2/2013 | Kaufmann et al. | |
| 2013/0103654 A1* | 4/2013 | McLachlan | G06F 16/23 707/692 |
| 2013/0166534 A1* | 6/2013 | Yoon et al. | 707/714 |
| 2013/0226888 A1* | 8/2013 | Govind | G06F 17/30132 707/698 |
| 2013/0232177 A1* | 9/2013 | Shoolman | G06F 17/30289 707/803 |

* cited by examiner

*Primary Examiner* — Irete F Ehichioya
*Assistant Examiner* — Johnese T Johnson
(74) *Attorney, Agent, or Firm* — Fountainhead Law Group P.C.

(57) ABSTRACT

A global dictionary is described that corresponds to a database or table stored across multiple partitions. The global dictionary can be used to identify which partitions of the database contain records that are relevant to a user's query on the database. The global dictionary is made up of variable tables. Each variable table corresponds to a column of the database. A given variable table includes value tables where each value table corresponds to a defined value that has been assigned to a record in the database. A value table can include a list of partitions that contain a record having the related defined value.

20 Claims, 7 Drawing Sheets

LEVEL 1

Global Dictionary 410

| rID | dB Column | Variable Table |
|---|---|---|
| 1 | fname | table |
| 2 | lname | table |
| 3 | gender | table |
| 4 | country | table |
| 5 | birthday | table |
| ... | ... | ... |

LEVEL 2

Variable Table for 'fname' 420

| rID | Value | Value Table |
|---|---|---|
| ... | ... | ... |
| 22 | John | table |
| 23 | Mary | table |
| 24 | Jane | table |
| ... | ... | ... |

LEVEL 3

Value Table for 'John' 430

| rID | PartitionID |
|---|---|
| 1 | Partition_1 |
| 2 | Partition_10 |
| 3 | Partition_12 |

GLOBAL DICTIONARY FOR DATABASE MANAGEMENT SYSTEMS

BACKGROUND

Unless otherwise indicated herein, the approaches described in this section are not prior art to the claims in this application and are not admitted to be prior art by inclusion in this section.

As we enter the era of "Big Data," information is being received from a wider range of sources. This has resulted in databases growing in size. Large databases naturally require more storage space, which can include a variety of storage mediums such as ram, solid state memory, hard disk, and others. For hard disks and other forms of partition-based storage mediums, many partitions can be used to store portions of the database. When a command is performed to locate information in the database, the multiple partitions must be scanned. This can be particularly time consuming and resource intensive as the database grows and the number of partitions increases.

SUMMARY

Embodiments of the present invention relate to improved techniques for querying a database stored across multiple partitions. In one embodiment a method is described for improving the runtime performance of queries on the database. A global dictionary can be utilized by the method to determine the partitions of the database that are relevant to the query. In this manner, irrelevant partitions can be skipped. The method can be a computer implemented method, possibly stored in non-transitory computer readable storage medium. The method can be executed by a processor of a computer system. In one embodiment, the method includes receiving, at a processor, a query configured to search a database that is stored across a plurality of partitions, determining, by the processor and according to a global dictionary, a subset of the plurality of partitions relevant to the query, and executing the query on the subset of partitions. In one example, the query is a search request for records in the database that have a database column set to a requested value.

In one embodiment, determining the subset can include locating, by the global dictionary, a variable table associated with the database column of the query, and locating, by the variable table, a value table associated with the requested value of the query, the value table identifying the subset of partitions.

In one embodiment, the value table includes a count of the number of records in one of the subset of partitions that have been assigned the requested value to the database column and wherein the subset of partitions are scanned in an order based on the count.

In another embodiment, the value table identifies a percentage describing the portion of records in one of the subset of partitions that have been assigned the requested value to the database column and wherein the subset of partitions are scanned in an order based on the percentage.

In another embodiment, the database is a column-oriented database and the global dictionary is generated from a plurality of dictionaries associated with the database.

In another embodiment, the database includes plurality of records each including values assigned to a plurality of database columns, and wherein the global dictionary includes a plurality of variable tables that correspond to the plurality of database columns, each variable table including a plurality of value tables, each value table correspond to a distinct value that has been assigned to at least one record of the database The following detailed description and accompanying drawings provide a better understanding of the nature and advantages of the present invention.

BRIEF DESCRIPTION OF THE DRAWINGS

FIG. 4 illustrates an exemplary global dictionary.

DETAILED DESCRIPTION

Described herein are techniques for improving the seek time for tables that are stored across multiple partitions. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

A database management system ("DBMS") is described for managing a database of records. The DBMS can perform many operations on the a table of the database, including query operations to locate content in the database. For example, the DBMS can perform a search request on a table of people (i.e., records) to locate people having the first name Larry. As another example, the DBMS can perform a search request to locate people that live in the United States. Since the table is stored across multiple partitions, the same query is performed on each partition of the database that stored a portion of the table.

To improve runtime performance, the DBMS can utilize a global dictionary to perform a first pass on the database. The first pass can identify a subset of the partitions that are relevant to the query. The global dictionary includes a hierarchically structured set of dictionary tables that are configured to identify partitions of the database that are relevant to the query. For example, partitions that contain a desired value assigned to a database column can be identified. The query is then performed on this subset of partitions. By skipping non-relevant partitions, the DBMS minimizes the number of partitions that are scanned during a search request thereby improving runtime performance.

Figure 1:
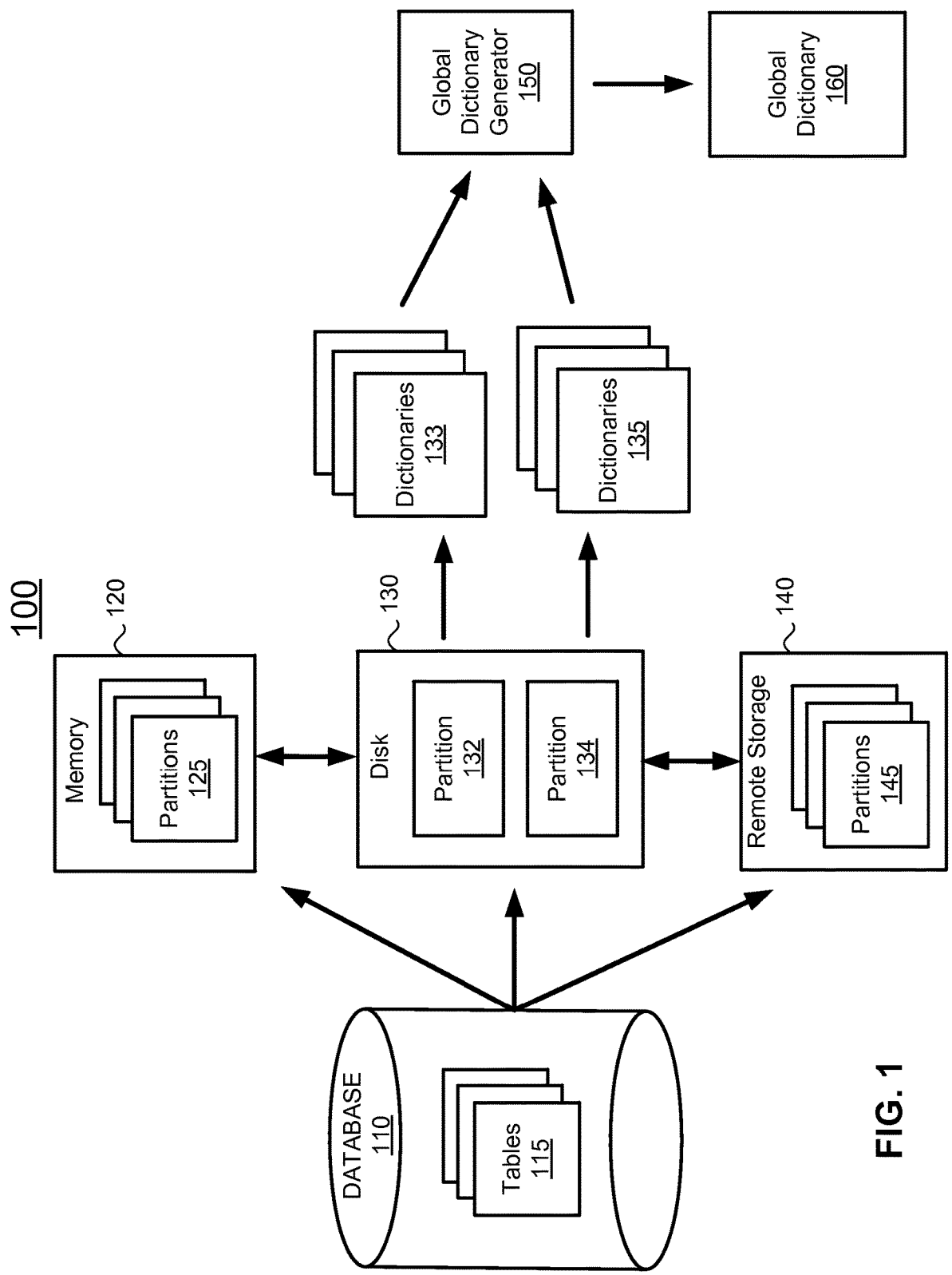
FIG. 1 illustrates an exemplary high level system diagram.

FIG. 1 illustrates an exemplary high level system diagram. System 100 includes database 110, memory 120, disk 130, and remote storage 140. Database 110 includes a plurality of tables 115 for presenting database information in a structured format. Each table can be stored in one or more partitions of memory 120, disk 130, and remote storage 140. Here, partitions 125 of memory 120 is allocated for storing database information. Similarly, partition 132 of disk 130, partition 134 of disk 130, and partitions 145 of remote storage 140 are also allocated for storing database information. System 100 includes a variety of data storage devices that each have their own advantages and disadvantages. For example, memory 120 can be high performance but expensive while remote storage 140 can be low performance but low cost. Disk 130 can be a middle ground in terms of cost and performance. A DBMS of system 100 can optimize the storage of data in these data storage devices such that data accessed frequently is stored in memory 220 while data access less frequently is stored in disk 130 or remote storage 140. As data ages, it can transition from memory 120 to disk 130 to remote storage 140.

Partition 132 of disk 130 further includes dictionaries 133. Dictionaries 133 can include a dictionary for each database column that belongs to a table stored in partition 132. Each dictionary can provide a summary describing the entries that have been entered into the related database column. For example, a portion of a table stored in partition 132 can include a column named gender. If the table includes both male and female records, the dictionary related to the gender column can include values "male" and "female." Similarly if the table includes only males, the dictionary related to the gender column would then only include the value "male." A one-to-one relationship can exist between the number of entries in the dictionary and the number of unique entries that have been entered in the database column Since each partition has its own set of dictionaries, dictionaries 135 can include a similar gender dictionary related to partition 134, which can include different entries than the gender dictionary related to partition 132.

Figure 2:
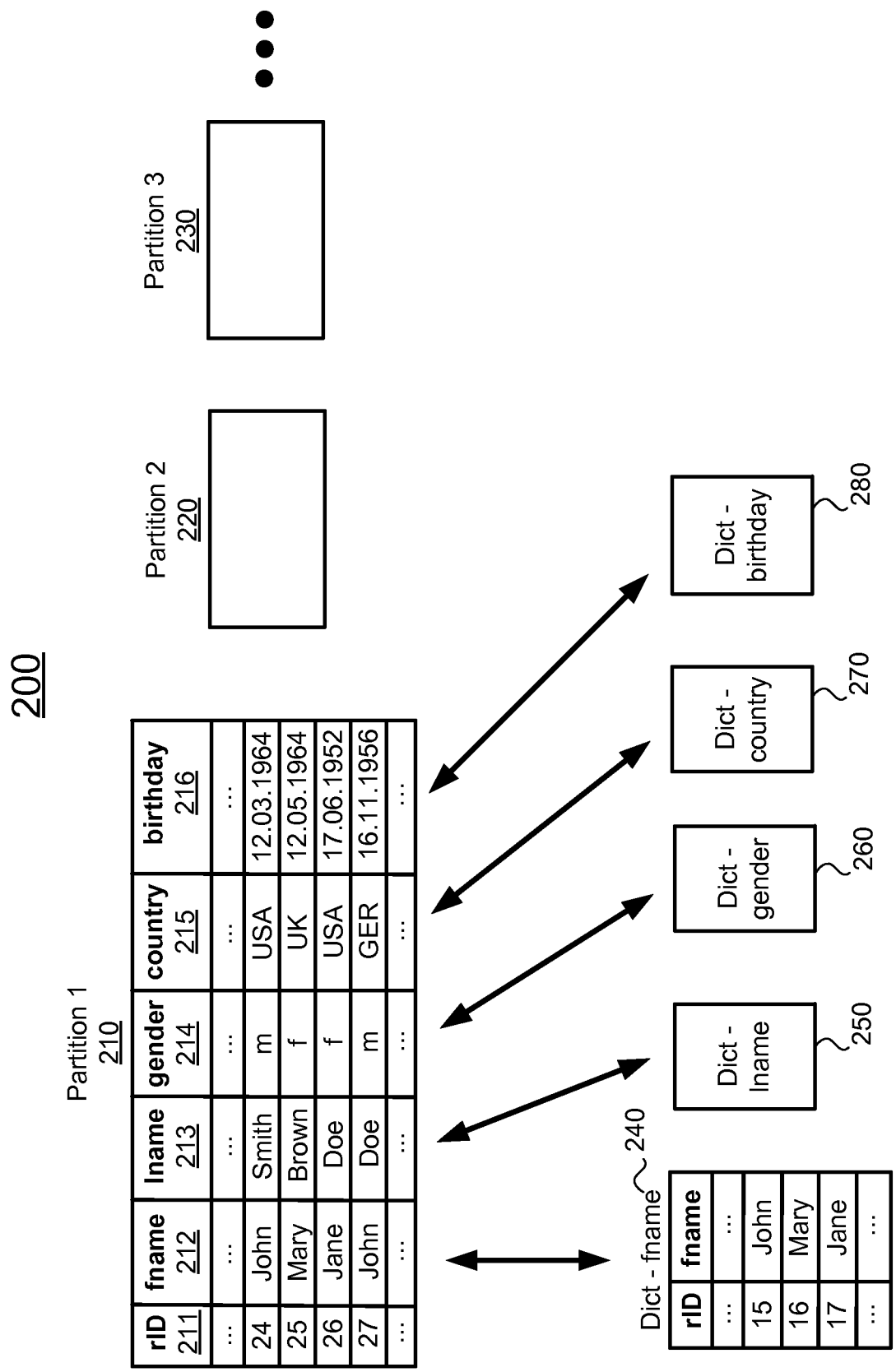
FIG. 2 illustrates an exemplary data storage device.

An example of the relationship between dictionaries and a partitions is shown in FIG. 2. FIG. 2 illustrates an exemplary data storage device. Data storage device 200 includes partitions 210, 220, and 230. Each partition can store a portion of a database table. Partition 210 stores a part of a table having records of people. Each record includes a value in each of the database columns (e.g., record ID 211, first name 212, last name 213, gender 214, country 215, and birthday 216). The database column first name 212 can be related to dictionary 240. Dictionary 240 stores the possible first name values that exist in partition 210. Here, the first names include "John," "Mary," and "Jane." As shown, dictionary 240 has three entries to represent the four values present in database column 212. Since the first name "John" appears twice in the table, both values can be represented by the single entry in row 15 of first name dictionary 240. In a similar fashion, last name dictionary 250 can be associated to last name database column 213, gender dictionary 260 can be associated with gender database column 214, country dictionary 270 can be associated with country database column 215, and birthday dictionary 280 can be associated with birthday database column 216. Each dictionary can include entries for each value defined in the database column.

Returning to FIG. 1, system 100 further includes global dictionary 160. As shown here, global dictionary generator 150 can process and combine sets of dictionaries (dictionaries 133 and 135) to form global dictionary 160. Alternatively, global dictionary generator 150 can parse the records of a table stored in partitions of memory 120, disk 130, and/or remote storage 140 to generate global dictionary 160. Global dictionary 160 can describe all the potential values for a database or a table of a database. Each row of the global dictionary can be configured to describe all the values for a database column of the database or table, irrespective of the partition that the portion of database or table resides on. For a given value of a database column, the global dictionary associated with the database column can identify the partitions of the database or table that contain records having that value. In other words, the global dictionary can be used to determine a subset of the partitions storing the database or table that are relevant to a query for a value of the database column.

The dictionaries or partitions that are combined to form global dictionary 160 can vary depending on implementation details. In one embodiment, system 100 can generate global dictionary 160 for data storage sources of a given type. As shown here, a global dictionary is generated for data storage sources that are of type disk. In another embodiment, system 100 can generate global dictionary for data storage sources that have more than predefined number of partitions. As data becomes less frequently accessed, data can be migrated off of high performance storage (i.e., hot partitions) such as memory 120 into low performance storage (i.e., cold partitions) such as disk 130. This is known as data aging. Economically, cold partitions are generally less expensive than hot partitions and thus a system may include more cold partitions than hot partitions. If the number of partitions is greater than a predefined value, system 100 can determine that a runtime improvement can be achieved by creating a global dictionary for the partitions. In yet another embodiment, system 100 can generate global dictionaries when the number of partitions that are used in a database or table exceeds a predefined value. When the database or table has grown to a certain size, system 100 can determine that a runtime improvement can be achieved by creating a set of global dictionaries for the partitions. In yet other embodiments, the determination of whether to generate global dictionaries to describe a plurality of partitions can be based on other considerations.

Figure 3:
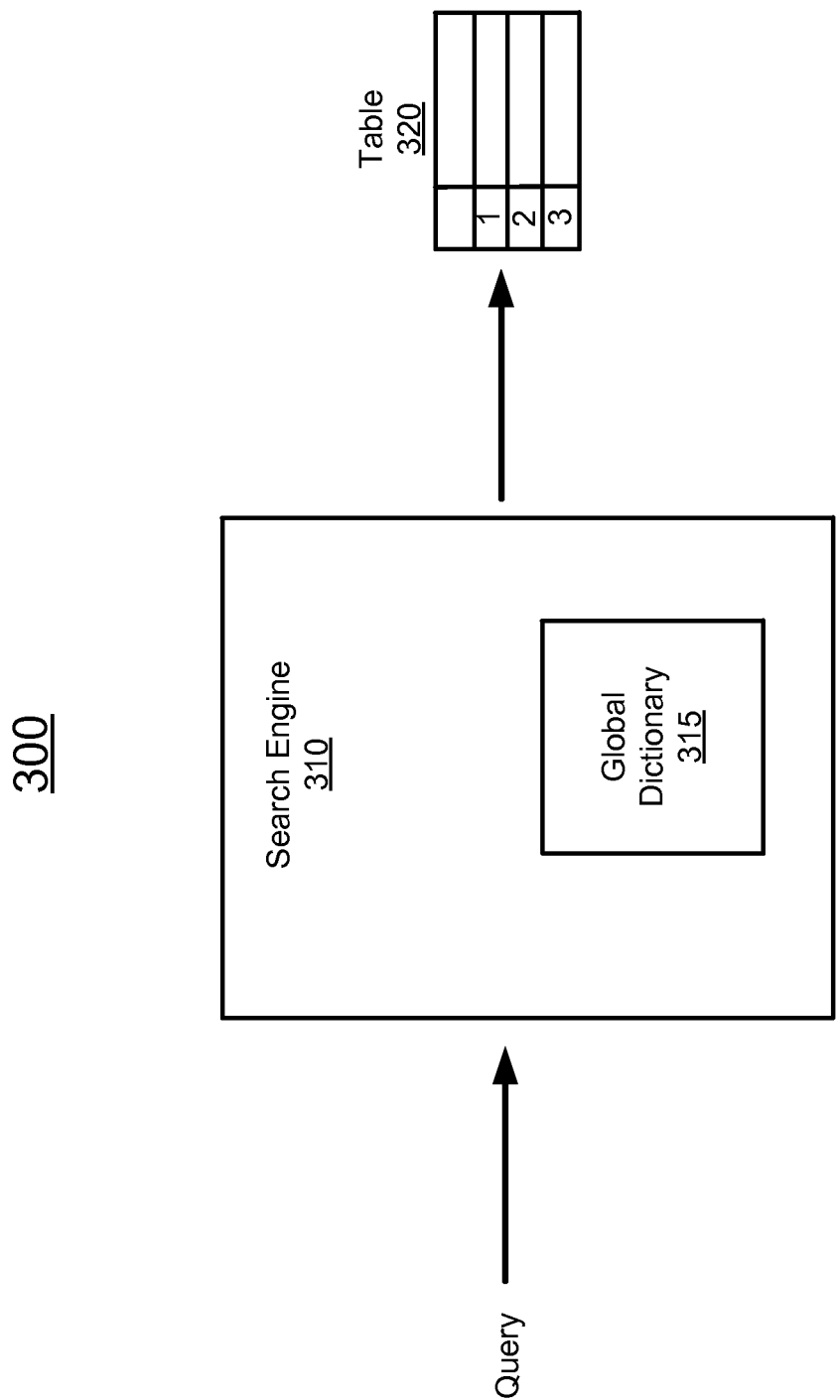
FIG. 3 illustrates an exemplary system for processing a query.

FIG. 3 illustrates an exemplary system for processing a query. In one example, the query can be to locate records in the database or table having a specified value in a database column. In another example, the query can be for a count on the number of records in the database or table having the specified value in the database column. In another example, the query can be for how much of a partition (in a percentage) is occupied by a specific value based on the partitioning criteria. In yet other examples, the query can be other forms of search requests for information from the database or table. System 300 includes search engine 310. Search engine 310 receives a query, determines by using the global dictionary set 315 a table that's relevant to the query, and outputs table 320. In some examples, table 320 can be a table stored within global dictionary set 315. In one embodiment, the search engine 310 hierarchically iterates through global dictionary set 315 to locate a table that is relevant to the query. For example, search engine 310 can use a database column from the query to narrow in on a subset of the tables stored in global dictionary set 315. Search engine can then select one of the tables from the subset of tables according to the value for the database column identified in the query. The selected table can include a list of partitions that include at least one record having the value assigned to the database column. Instead of querying all the partitions of the database or table to satisfy the query, only the listed partitions are queried. By minimizing the number of partitions to be queried, the runtime performance of the query request is improved.

FIG. 4 illustrates an exemplary global dictionary. Global dictionary 400 can be similar or substantially similar to global dictionary 315 of FIG. 3 or global dictionary 160 of FIG. 1. As described above, global dictionary 400 can be related to a database or table that is stored across multiple partitions. For simplicity, global dictionary 400 will be described below as being related to a database however it is to be understood that it can also be related to a table stored within a database. Global dictionary 400 is a multi-level table that evaluates the database as a whole rather than individual partitions. In the first level, global dictionary 400 includes table 410 where each database column of the database is presented as a row in table 410. As shown, database columns 212, 213, 214, 215, and 216 of FIG. 2 are each presented in a row of table 410. The names of the database columns are stored in a first column of table 410 while a corresponding variable table is stored in a second column of table 410. Thus, each defined database column resides in a row of table 410 where a first column of table 410 stores the name of the database column and a second column of table 410 stores a variable table that corresponds with the database column. The plurality of variable tables make up the second level of global dictionary 400.

In the second level, global dictionary 400 includes multiple variable tables. Variable table 420 is an exemplary variable table that corresponds with the database column named "fname" shown in table 410. Each database column (also known as variables of the database) in the database has a corresponding variable table. Variable table 420, like all variable tables in the second level, is configured to provide analysis of the values that have been assigned to the variable in the database. Thus, variable table 420 includes a complete list of the different values that the variable has been set as across all partitions of the database.

Here, the values that have been set as the variable "fname" in the database include the names "John," "Mary," and "Jane." Each value can be accompanied by analysis corresponding to the value. In one embodiment, the analysis can include a count on the number of instances which the value appears in the database. The number of instances can be directly related to the number of records present in the database that have the value. For example, a count of 20432 that is associated with the first name "John" would mean that 20432 records (i.e., people) in the database have the value "John" set as the first name. In another embodiment, the analysis can include the partitions of the database which contain that value. As shown here, the row of variable table 420 that corresponds to the value "John" is associated with a value table 430. Value table 430 can include a list of partitions that contain a record having the "fname" variable set to the value "John." Here, value table 430 identifies partition_1, partition_10, and partition_12 as containing a record having the value "John" assigned to the variable "fname."

Besides identifying the partitions which contain a value, other information can be provided about the database or partitions of the database. In one embodiment, the analysis can also include the number of records in the database that have been set to the value or the number of records in a particular partition that have been set to the value. For example, variable table 420 can include an additional column (not shown) which stores a number describing the number of records in the database that contain the value. In another embodiment, the analysis can include a percentage, ratio, or fraction describing the number of records in the partition that contain the value versus the total number of records in the partition. For example, value table 430 can include an additional column (not shown) which stores a percentage, ratio, or fraction describing the number of records in the partition that contain the value versus the total number of records in the partition. Alternatively, the count of the number of records in the partition that contain the value can also be presented in value table 430. This information can be used during scanning of the partitions to determine the order that the partitions are scanned. Partitions containing more records can be scanned before partitions containing less records. Alternatively, partitions containing a higher percentage of relevant records that contain the value can have priority in the scan order. In yet other examples, other statistical results relating to the value can be calculated across the database or on a partition-by-partition basis and stored on variable table 420 or value table 430.

Figure 5:
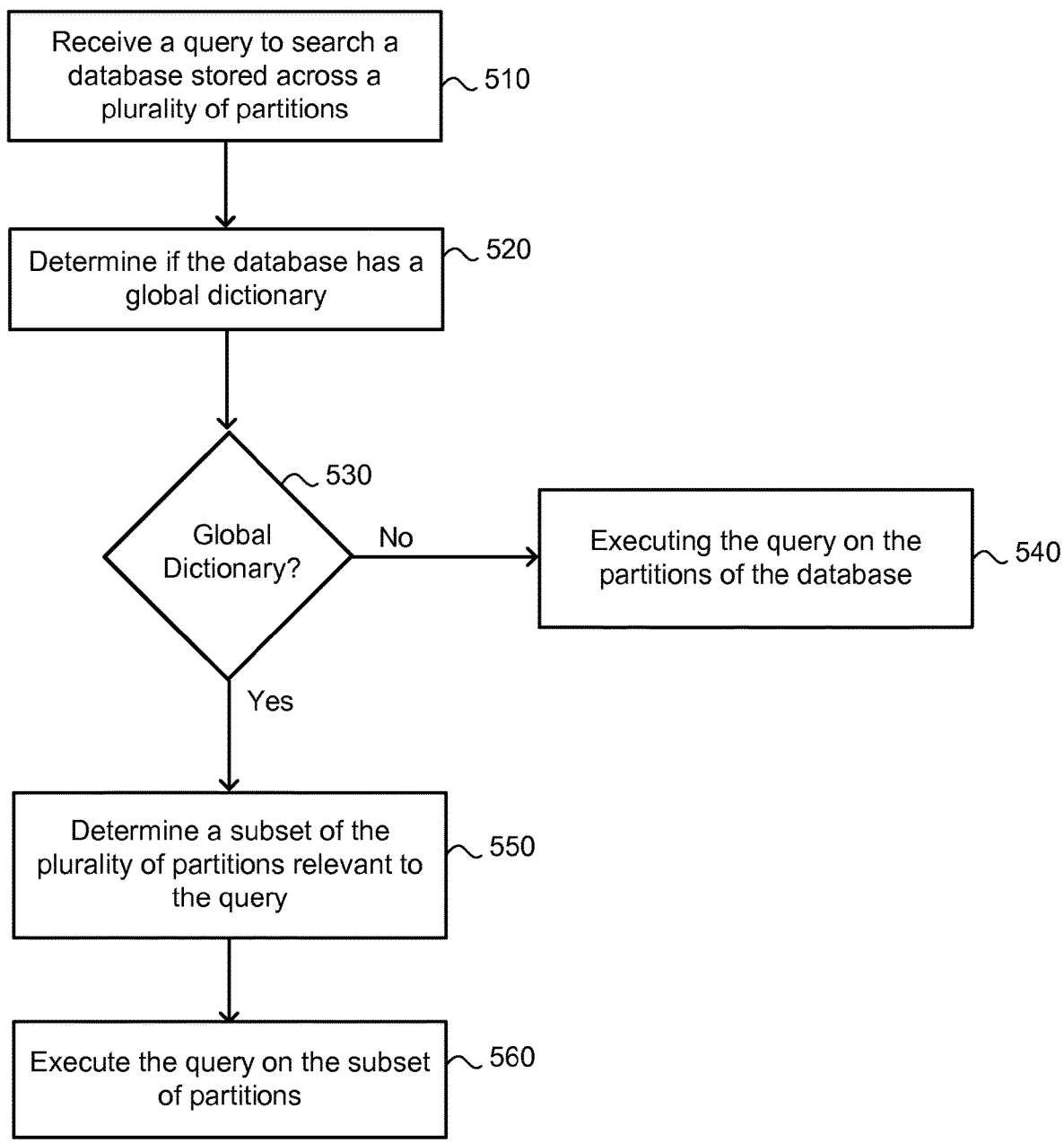
FIG. 5 illustrates an exemplary method to process a query to search a database stored across multiple partitions.

FIG. 5 illustrates an exemplary method to process a query to search a database stored across multiple partitions. Process 500 can be stored in a computer readable medium and executed by a system such as system 300 of FIG. 3. Process 500 begins receiving a query to search a database at 510. Once the query is received, a determination is made as to whether the database has a global dictionary at 520. This can include conducting a search for a global dictionary that corresponds with the database. If a global dictionary does not exist at 530, the query is executed on all partitions of the database at 540. Alternatively if a global dictionary does exist at 530, process 500 determines a subset of the database partitions that are relevant to the query at 550. Once the subset of partitions has been determined, the query is executed on the subset of partitions at 560.

Figure 6:
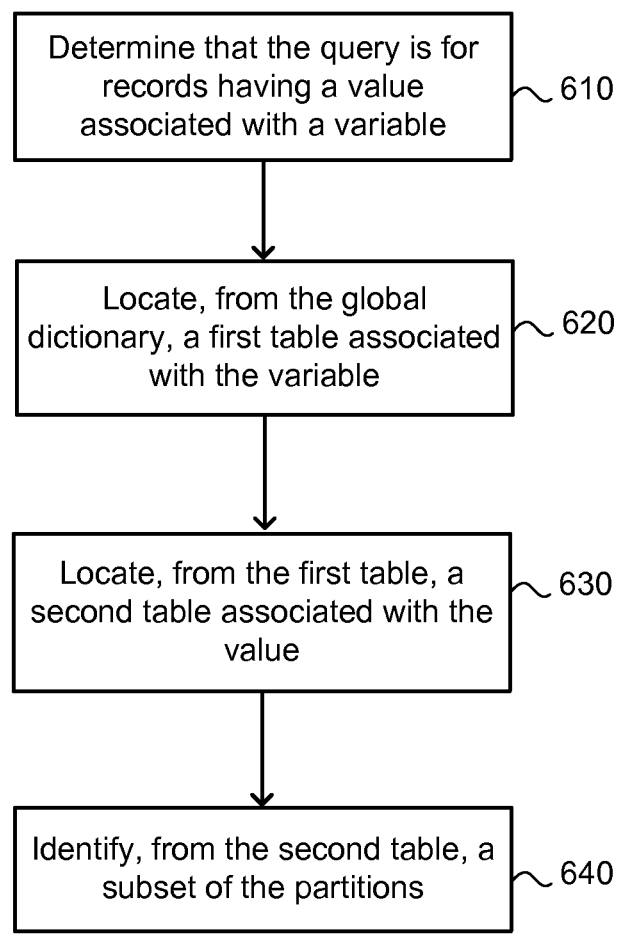
FIG. 6 illustrates an exemplary method to determine a subset of database partitions that are relevant to a query.

FIG. 6 illustrates an exemplary method to determine a subset of database partitions that are relevant to a query. Process 600 can be stored in a computer readable medium and executed by a system such as system 300 of FIG. 3. In one example, process 600 can be performed in the place of step 550 of FIG. 5. Process 600 begins by determining that the query is for records having a value associated with a variable. For example, the query can be for recording having the name "John" associated with the variable "first name." Process 600 then continues by locating, from the global dictionary, a first table associated with the variable (i.e., database column). An exemplary global dictionary is shown in FIG. 4. The first table can be a variable table. An exemplary variable table is shown as table 420 of FIG. 4. Process 600 then continues by locating, from the first table, a second table associated with the value. The second table can be a value table. An exemplary value table is shown as table 430 of FIG. 4. After the value table has been located, a subset of partitions from the plurality of database partitions can be identified from the second table at 640.

Figure 7:
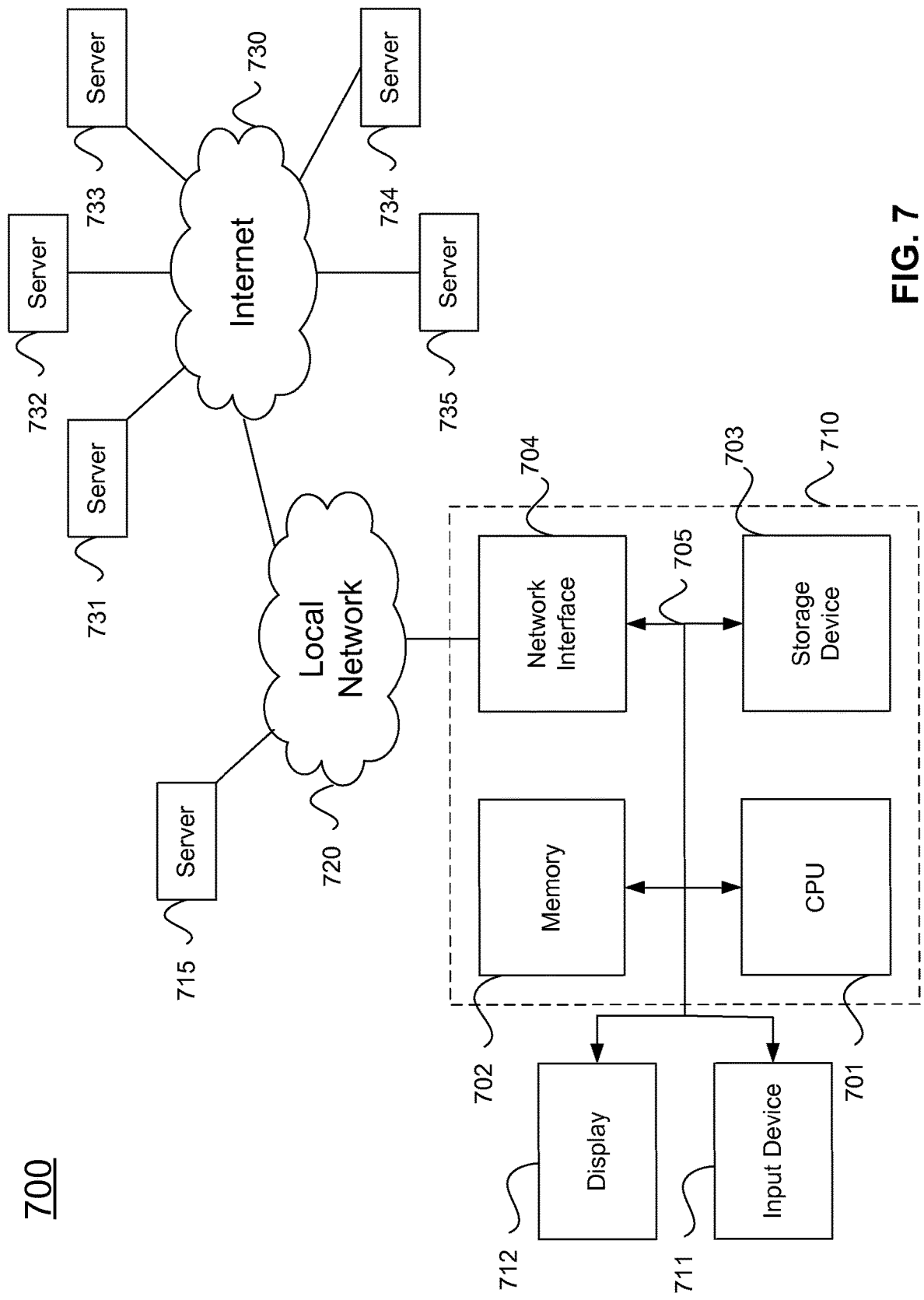
FIG. 7 illustrates an exemplary computer system.

An exemplary computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 175 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
    receiving, at a processor, a query configured to search a database for records within the database that have a value assigned to a variable, wherein the database is stored across a plurality of partitions;
    accessing, by the processor, a global dictionary to identify a variable table associated with the variable, wherein the global dictionary includes a plurality of variables within the database and a plurality of variable tables, wherein there is a one-to-one mapping between the plurality of variables and the plurality of variable tables;
    accessing, by the processor, the variable table to identify a value table associated with the value; and
    accessing, by the processor, the value table to identify a subset of the plurality of partitions which contain at least one record having the value assigned to the variable, wherein the value table includes a count of a number of records in one of the subset of partitions that have been assigned the value to the variable, wherein the subset of partitions are scanned in an order based on the count.

2. The computer-implemented method of claim 1, wherein the database is a column-oriented database and the global dictionary is generated from a plurality of dictionaries each associated with one of the plurality of partitions of the database.

3. A non-transitory computer readable storage medium storing one or more programs, the one or more programs comprising instructions for:
    receiving a query configured to search a database for records within the database that have a value assigned to a variable, wherein the database is stored across a plurality of partitions;
    accessing a global dictionary to identify a variable table associated with the variable, wherein the global dictionary includes a plurality of variables within the database and a plurality of variable tables, wherein there is a one-to-one mapping between the plurality of variables and the plurality of variable tables;
    accessing the variable table to identify a value table associated with the value; and
    accessing the value table to identify a subset of the plurality of partitions which contain at least one record having the value assigned to the variable, wherein the value table includes a count of a number of records in one of the subset of partitions that have been assigned the value to the variable, wherein the subset of partitions are scanned in an order based on the count.

4. The non-transitory computer readable storage medium of claim 3, wherein the database is a column-oriented database and the global dictionary is generated from a plurality of dictionaries each associated with one of the plurality of partitions of the database.

5. A computer implemented system, comprising:
    a processor;
    a display; and
    memory storing instructions configured to:
    receive a query configured to search a database for records within the database that have a value assigned to a variable, wherein the database is stored across a plurality of partitions;
    access a global dictionary to identify a variable table associated with the variable, wherein the global dictionary includes a plurality of variables within the database and a plurality of variable tables, wherein there is a one-to-one mapping between the plurality of variables and the plurality of variable tables;
    access the variable table to identify a value table associated with the value; and
    access the value table to identify a subset of the plurality of partitions which contain at least one record having the value assigned to the variable, wherein the value table includes a count of a number of records in one of the subset of partitions that have been assigned the value to the variable, wherein the subset of partitions are scanned in an order based on the count.

6. The computer-implemented method of claim 1, wherein the plurality of partitions include a memory partition, a disk partition, and a remote storage partition.

7. The computer-implemented method of claim 1, wherein the variable table includes a plurality of value tables and a plurality of values within the database that have been assigned to the variable, wherein there is a one-to-one mapping between the plurality of value tables and the plurality of values.

8. The computer-implemented method of claim 1 further comprising executing the query on the subset of partitions.

9. The non-transitory computer readable storage medium of claim 3, wherein the plurality of partitions include a memory partition, a disk partition, and a remote storage partition.

10. The non-transitory computer readable storage medium of claim 3, wherein the variable table includes a plurality of value tables and a plurality of values within the database that have been assigned to the variable, wherein there is a one-to-one mapping between the plurality of value tables and the plurality of values.

11. The non-transitory computer readable storage medium of claim 3, wherein the one or more programs further comprises instructions for executing the query on the subset of partitions.

12. The computer implemented system of claim 5, wherein the plurality of partitions include a memory partition, a disk partition, and a remote storage partition.

13. The computer implemented system of claim 5, wherein the variable table includes a plurality of value tables and a plurality of values within the database that have been assigned to the variable, wherein there is a one-to-one mapping between the plurality of value tables and the plurality of values.

14. The computer implemented system of claim 5, wherein the instructions are further configured to execute the query on the subset of partitions.

15. The system of claim 5, wherein the database is a column-oriented database and the global dictionary is generated from a plurality of dictionaries each associated with one of the plurality of partitions of the database.

16. The computer-implemented method of claim 1 further comprising:
parsing records in the plurality of partitions; and
generating the global dictionary based on the parsing.

17. The computer-implemented method of claim 1, wherein a first partition in the subset of partitions having the count of the number of records that is higher than the count of the number of records of a second partition in the subset of partitions is scanned before the second partition.

18. The non-transitory computer readable storage medium of claim 3, wherein the one or more programs further comprises instructions for:
parsing records in the plurality of partitions; and
generating the global dictionary based on the parsing.

19. The non-transitory computer readable storage medium of claim 3, wherein a first partition in the subset of partitions having the count of the number of records that is higher than the count of the number of records of a second partition in the subset of partitions is scanned before the second partition.

20. The system of claim 5, wherein the instructions are further configured to:
parsing records in the plurality of partitions; and
generating the global dictionary based on the parsing.

* * * * *